United States Patent [19]

Kawada et al.

[11] 4,300,079
[45] Nov. 10, 1981

[54] DC MOTOR CONTROL SYSTEM

[75] Inventors: Shigeki Kawada; Yoshiki Fujioka; Naoto Ohta, all of Hino; Yasuo Takahasi, Tokyo, all of Japan

[73] Assignee: Fujitsu Fanuc Limited, Japan

[21] Appl. No.: 32,672

[22] Filed: Apr. 23, 1979

[30] Foreign Application Priority Data

Apr. 26, 1978 [JP] Japan .................................. 53-49414

[51] Int. Cl.³ .............................................. H02P 5/16
[52] U.S. Cl. .................................. 318/390; 318/271; 318/278; 318/338
[58] Field of Search ................ 318/385, 390, 391, 392, 318/393, 394, 395, 396, 397, 398, 270, 271, 278, 332, 338

[56] References Cited

U.S. PATENT DOCUMENTS

| | | | |
|---|---|---|---|
| 3,309,597 | 3/1967 | Gabor et al. | 318/393 |
| 3,359,477 | 12/1967 | Wasai et al. | 318/395 |
| 3,405,259 | 10/1968 | Sano | 318/271 |
| 3,471,073 | 10/1969 | Brown et al. | 318/260 |
| 3,586,946 | 6/1971 | Sadashige | 318/398 |
| 3,586,949 | 6/1971 | Spear | 318/332 |
| 3,599,064 | 8/1971 | Friedman | 318/338 |
| 3,706,020 | 12/1972 | Klang | 318/270 |
| 3,735,225 | 5/1973 | Raatz | 318/332 |
| 3,809,452 | 5/1974 | Heinz | 318/271 |
| 3,904,943 | 9/1975 | Klang | 318/395 |
| 4,109,190 | 8/1978 | McNaughton | 318/271 |

OTHER PUBLICATIONS

Gottlieb, I. M., *Electric Motors & Electronic Motor Control Techniques*, Howard Sams & Co., 1976, pp. 117-119.

*Primary Examiner*—David Smith, Jr.
*Attorney, Agent, or Firm*—Staas & Halsey

[57] ABSTRACT

A DC motor control system which has means for detecting the rise and fall of a drive command signal to generate an ON ACCELERATION/DECELERATION signal and means for generating a current limit signal for driving a DC motor by the ON ACCELERATION/DECELERATION signal to produce a rated output and for driving the DC motor to produce an output 1/n times the rated output when the DC motor is switched from an acceleration state to a stationary state. When the DC motor is accelerated or decelerated by the drive command signal, a current for obtaining the rated output is applied to the armature of the DC motor and, in the stationary state, even when a load on the DC motor is maximum a current for obtaining an output 1/n times the rated output is applied to the armature of the DC motor to reduce the output of the large-output DC motor, thereby providing an enlarged constant output DC motor range.

8 Claims, 8 Drawing Figures

DC MOTOR CONTROL SYSTEM

BACKGROUND OF THE INVENTION

1. Field of the Invention

This invention relates to a DC motor control system which provides a constant DC motor output characteristic over a wide range and ensures excellent response of the DC motor.

2. Description of the Prior Art

Where a DC motor having field windings is employed for driving a spindle of a machine tool, the DC motor is usually driven in the range in which its output characteristic is constant.

At low speeds, the DC motor has a constant torque characteristic and produces an output proportional to the number of revolutions. At high speeds, it exhibits a constant output characteristic regardless of the number of revolutions. The output characteristic of a DC motor having a rated output of 15 KW and a revolving speed of 3500 r.p.m., for example, is constant in the range from 1160 to 3500 r.p.m. and has a constant torque characteristic below 1160 r.p.m., as shown in FIG. 1. Accordingly, when this DC motor is used for the above-mentioned spindle drive, it is driven in the range of 1160 to 3500 r.p.m.

However, there is a demand for spindle drives covering the lower speed range and, to meet this demand, a speed change mechanism utilizing a gear, a clutch, etc. is coupled to the DC motor to reduce its revolving speed, for example, to $\frac{1}{3}$, thus enlarging the constant output range for the spindle drive. That is, as indicated by the broken line in FIG. 1, the constant output range can be enlarged by the speed change mechanism to cover 380 to 3500 r.p.m. However, the provision of such a speed change mechanism introduces complexity in construction, requires extra space and increases inertia of the load on the DC motor to degrade its response.

Another means of enlarging the constant output range is to drive the DC motor in a manner to produce an output which is $\frac{1}{2}$ or $\frac{1}{3}$ of its rated output, as depicted in FIG. 2. For instance, if a DC motor having a rated output of 15 KW is driven to provide an output 5 KW, the constant output characteristic can be obtained in the range of from 380 to 3500 r.p.m. However, this method also has the defect of lowered response of the DC motor due to the limitation of its output.

SUMMARY OF THE INVENTION

An object of this invention is to provide a DC motor control system which is free from the above-mentioned defects of the prior art and which enlarges the constant output range, without using any speed change mechanism, and enhances the response of a DC motor.

According to this invention, in a DC motor control system an armature current and a revolving speed of the DC motor are detected to obtain feedback signals for comparison with a drive command signal to drive the DC motor at a commanded revolving speed. Means are provided for detecting the rise and fall of the drive command signal and for generating an ON ACCELERATION/DECELERATION signal. Means are provided for generating a current limit signal, which drives the DC motor by the ON ACCELERATION/DECELERATION signal to produce a rated output and which drives the DC motor to produce an output 1/n times the rated output when the DC motor has reached its stationary state. During the acceleration or deceleration by the drive command signal, a current for producing the rated output is applied to an armature of the DC motor to drive it and, in the stationary state, a current for producing an output 1/n times the rated output is applied to the armature of the DC motor to drive it.

DESCRIPTION OF THE PREFERRED EMBODIMENTS

Figure 3:
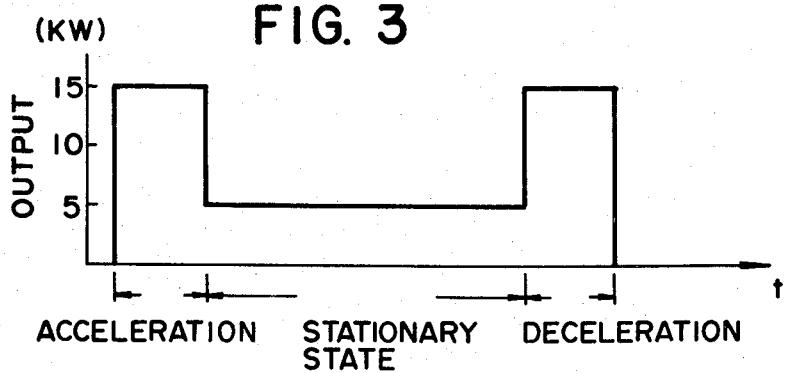
FIG. 3 illustrates the principles of this invention.

According to the invention as shown in FIG. 3, a DC motor having a rated output of 15 KW is driven in a manner to yield the output of 15 KW in an acceleration or deceleration period, and a limited output of, for example, 5 KW in a stationary state period. In the stationary state period, the output is limited to enlarge the constant output range and, in the acceleration or deceleration period, the motor is driven in a manner to produce the rated output, whereby enhanced DC motor response is provided.

Figure 4:
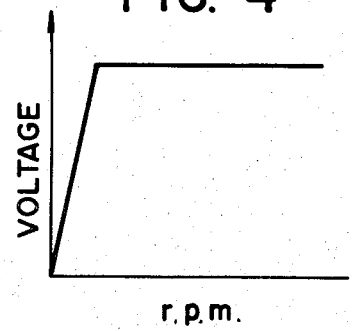
FIG. 4 illustrates the armature voltage characteristic of this invention.
Figure 5:
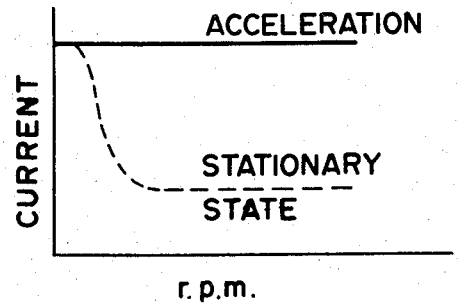
FIG. 5 illustrates the armature current characteristic in this invention.

FIG. 4 shows an armature voltage characteristic and FIG. 5 an armature current characteristic. In the acceleration period, a rated current is applied to the motor regardless of its speed and, in the stationary state drive period, a smaller current is applied in a certain speed range to provide a constant output characteristic. That is, the field is controlled so that the armature voltage may be constant as shown in FIG. 4 and, in dependence upon whether the motor is in its acceleration or stationary state drive period, the armature current is controlled, as shown in FIG. 5.

Figure 6:
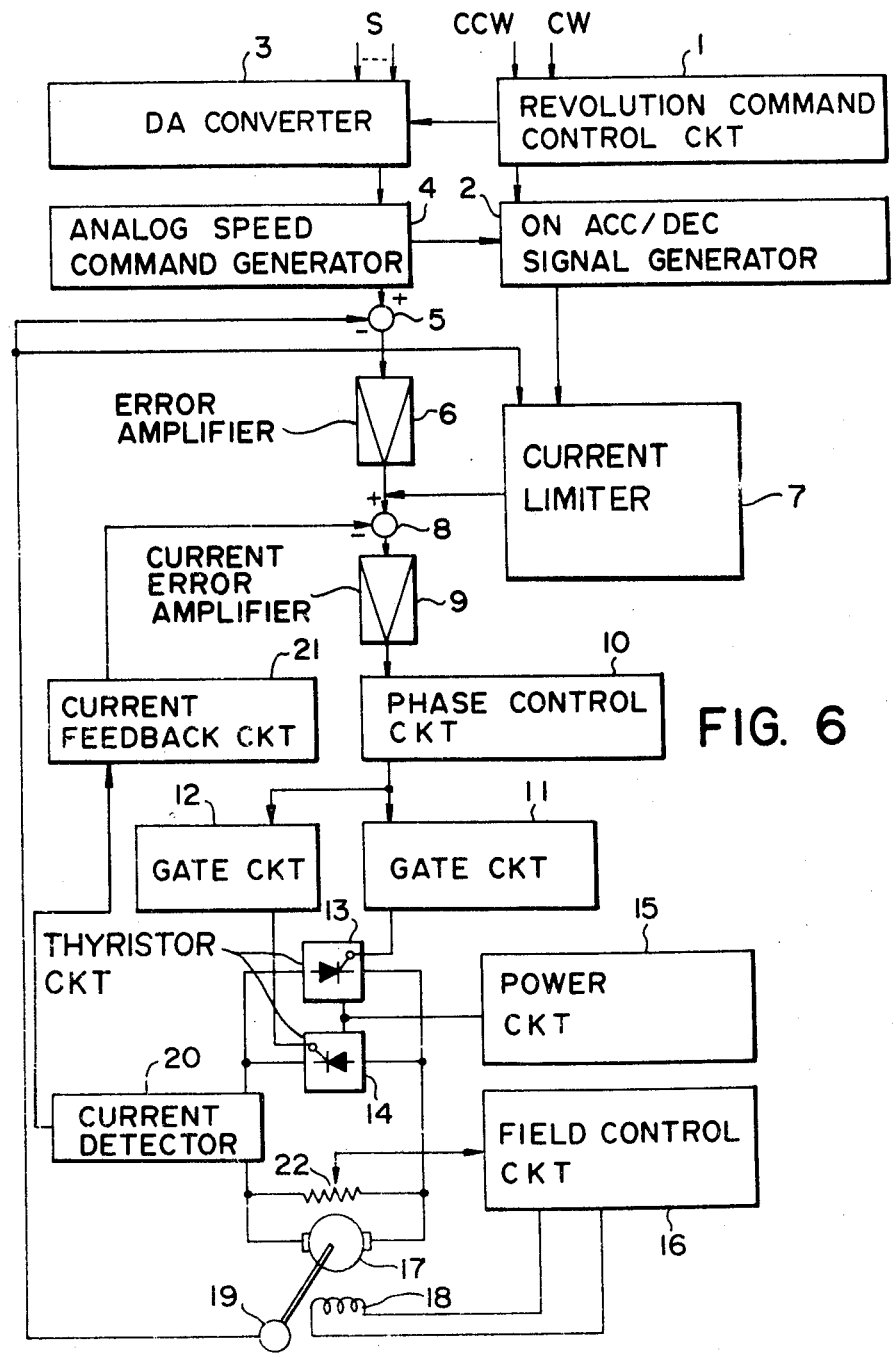
FIG. 6 is a block diagram illustrating an embodiment of this invention.

FIG. 6 illustrates in block form an embodiment of this invention. A clockwise revolution command signal CW or counterclockwise revolution command signal CCW is applied to a revolution command control circuit 1 to supply each of an ON ACCELERATION/DECELERATION (hereinafter referred to simply as ON ACC/DEC) signal generator 2 and a D-A converter 3 with a signal corresponding to the direction-of-revolution command signal CW or CCW. A digital speed command signal S is converted by the D-A converter 3 to a positive or negative analog voltage corresponding to the direction-of-revolution command signal applied to the converter 3, which voltage is provided to an analog speed command voltage generator 4. The output from the analog speed command voltage generator 4 is applied to the ON ACC/DEC signal generator 2 which detects a change in the analog speed command voltage to generate an ON ACC/DEC signal for input to a current limit setting circuit 7.

The adder 5 provides a speed error signal corresponding to a difference between the analog speed command voltage and a speed feedback voltage derived from a tachometer 19. The speed error signal is applied to an error amplifier 6. The outputs from the error amplifier 6 and the current limit setting circuit 7 are provided to one input of an adder 8. A current of an armature 17 of a DC motor is detected by a current detector 20 and the detected output is applied via a current feedback circuit 21 to the other input of the adder 8.

The output from the adder 8 is amplified by a current error amplifier 9 and provided to a phase control circuit 10 to control gate circuits 11 and 12, yielding signals for controlling the gates of thyristor circuits 13 and 14. A current from a power circuit 15, which is controlled by the thyristor circuits 13 and 14, is applied to the armature 17 and an armature voltage is detected by a resistor 22 and applied to a field control circuit 16, by which a current to a field winding 18 is controlled to make the armature voltage constant.

Figure 7:
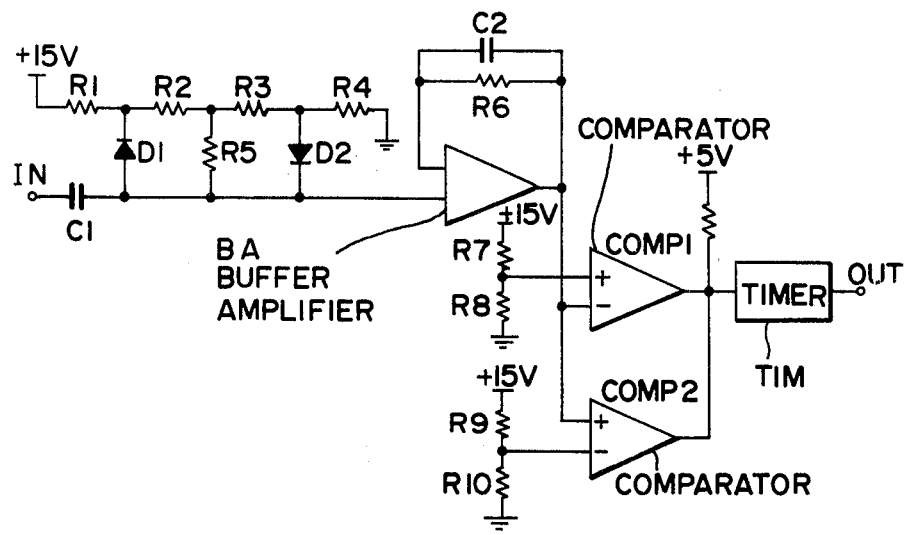
FIG. 7 is a block diagram showing the principal part of an ON ACCELERATION/DECELERATION signal generator employed in this invention.

The ON ACC/DEC signal generator 2 has such a construction, for example, as shown in FIG. 7, in which the speed command analog voltage from the speed command analog voltage generator 4 is provided to an input terminal IN. A capacitor C1, resistors R1 to R5 and diodes D1 and D2 make up a differentiation circuit, the output from which is supplied to a buffer amplifier BA. Reference characters C2 and R6 indicate a capacitor and a resistor for the feedback use. Comparators COMP1 and COMP2 are supplied with reference voltages respectively divided by resistors R7 to R10 and each compare the reference voltage and the output voltage from the buffer amplifier BA. The buffer amplifier BA and the comparators COMP1 and COMP2 constitute a level comparator. The rise and fall of the analog speed command voltage are detected by the aforesaid differentiation circuit and it is decided by the level comparator whether or not the level of the output from the differentiation circuit is above a predetermined value, thereby to prevent malfunction due to noises or the like. When the positive or negative differentiated output is in excess of the reference voltages of the comparators COMP1 and COMP2, an acceleration/deceleration start trigger pulse is derived from the comparator COMP1 or COMP2 to start a timer TIM. The output from the timer TIM is applied as the aforementioned ON ACC/DEC signal from an output terminal OUT to the current limit setting circuit 7.

The current limit setting circuit 7 is a kind of function generator and has an output characteristic as depicted in FIG. 5. When supplied with the ON ACC/DEC signal, the current limit setting circuit 7 produces a maximum current signal regardless of the speed feedback voltage from the tachometer 19. In the absence of the ON ACC/DEC signal, the circuit 7 yields a signal which decreases a current with an increase in the speed feedback voltage, i.e. an increase in the number of revolutions of the DC motor and provides a limited current when the number of revolutions of the DC motor exceeds a predetermined value. The current limit setting circuit 7 can be made up of, for example, a resistor and a switching element.

Upon application of the revolution command signals CW and CCW and the speed command signal S to the revolution command circuit the ON ACC/DEC signal generator 2 detects the rise of the analog speed command voltage from the analog speed command voltage generator to apply the ON ACC/DEC signal to the current limit setting circuit 7. Since the current limit setting circuit 7 does not suppress the output from the speed error amplifier 6, a current of a rated output is provided via the thyristor circuits 13 and 14 to the armature 17 to start the DC motor with a signal for producing the rated output.

The ON ACC/DEC signal generator 2 generates the ON ACC/DEC signal, for example, for a period of time defined by the aforesaid timer TIM and when the ON ACC/DEC signal is turned OFF, the current limit setting circuit 7 produces a current limit signal following the speed feedback voltage to suppress the output from the error amplifier 6. As a consequence, the output from the adder 8 is reduced to zero when the feedback current signal is below a rated value, so that the current of the armature 17 is limited.

Figure 8:
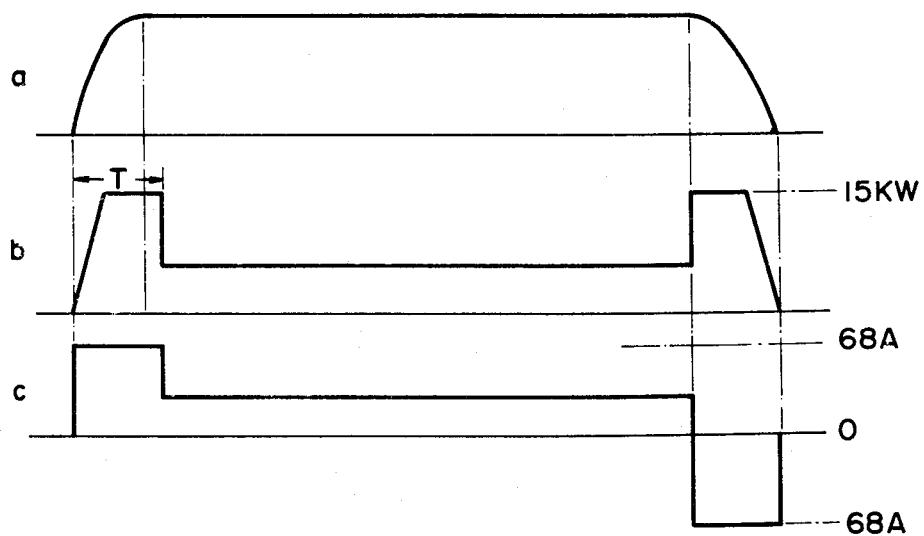
FIGS. 8a to c show number-of-revolution, output and current characteristics, respectively, of a DC motor employing the present invention.

FIGS. 8a to c respectively show the number-of-revolutions characteristic, the output characteristic and the current characteristic of the DC motor in the case of its rated output being 15 KW and its number of revolutions being 3500 r.p.m. At the time of start, since the DC motor is controlled to produce the rated output for the time T determined by the timer TIM, it is rapidly accelerated. At the time of halt, as regenerative braking takes place, the direction of current is reversed and the current in this case is controlled to be a current for yielding the rated output, and consequently the motor is rapidly decelerated.

Figure 1:
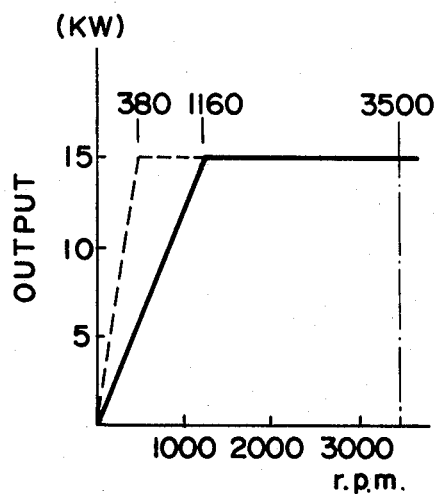
FIG. 1 is illustrates the output characteristic of a DC motor and the enlargement of its constant output range by the employment of a speed change mechanism.
Figure 2:
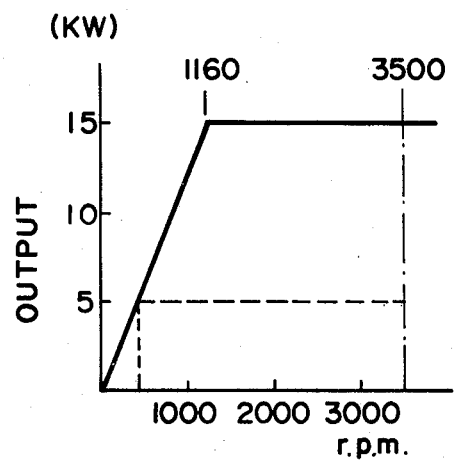
FIG. 2 illustrates the enlargement of the constant output range of the DC motor by limiting its output.

As has been described in the foregoing, according to this invention, during acceleration or deceleration a current for the rated output is applied by the ON ACC/DEC signal to the armature 17; therefore, even if a load on the DC motor is large, the motor exhibits excellent response. In the stationary state, a current for an output 1/n times the rated output is supplied to the DC motor, thereby to enlarge the number-of-revolution range in which the DC motor has the constant output characteristic, as described previously in respect of FIG. 2. Therefore, even if no speed change mechanism is employed, a wide range of constant output characteristic is obtained and the space for installation of such a speed change mechanism can be saved and, on top of that, the drive mechanism for a machine tool or the like is simplified.

It will be apparent that many modifications and variations may be effected without departing from the scope of the novel concepts of this invention.

What is claimed is:

1. A DC motor control system, for providing a DC motor with a constant output characteristic, said DC motor having an armature and a tachometer for providing a speed feedback voltage signal, said system comprising:

command means for providing an analog speed command signal;

means for comparing said speed feedback voltage signal with said analog speed command signal and for generating a speed error signal for controlling the revolving speed of the DC motor;

first means, operatively connected to said command means, for detecting the rise and fall of said analog speed command signal and for generating an ON ACCELERATION/DECELERATION signa;

second means, connected to said first means, for providing the ON ACCELERATION/DECELER- ATION signal in accordance with the output of said first means and for generating a current limit signal when the DC motor is switched from an acceleration state to a stationary state; and third means, operatively connected to said second means and to the armature, for applying a drive current for producing a rated output to the armature of the DC motor when said second means provides the ON ACCELERATION/DECELERATION signal, and for applying a current for producing an output 1/n times the rated output to the armature of the DC motor when said second means generates the current limit signal, regardless of the magnitude of its load, to reduce the output of the DC motor, thereby providing the DC motor with an enlarged constant output range.

2. A DC motor control system according to claim 1, wherein said first means comprises a timer which is triggered by detection of the rise and fall of the analog speed command signal, said timer having an output which is used as the ON ACCELERATION/DECELERATION signal.

3. A DC motor control system according to claim 1, wherein said second means generates said current limit signal such that the current provided by said third means to the DC motor decreases with an increase in the feedback signal of the detected revolving speed of the DC motor.

4. A DC motor control system for providing a DC motor with a constant output characteristic, said DC motor having an armature and a tachometer for providing a speed feedback voltage signal, said system comprising:

command means for providing an analog speed command voltage signal;

an ON ACC/DEC signal generator circuit, operatively connected to said command means, for receiving said analog speed command voltage signal and for outputting an ON ACC/DEC signal when a change in the analog speed command voltage signal is detected;

a current limiter circuit, connected to said ON ACC/DEC signal generator circuit and to the tachometer, for outputting said ON ACC/DEC signal when said ON ACC/DEC signal is present and for generating a current limit signal dependent upon the speed feedback voltage signal when said ON ACC/DEC signal is absent so that the constant output range of the DC motor is increased;

a first adder circuit, operatively connected to the tachometer and said command means, for receiving the analog speed command voltage signal and the speed feedback voltage signal, and for generating a speed error signal by subtracting the speed feedback voltage signal from the analog speed command voltage signal;

a current detector circuit, operatively connected to the armature, for detecting the armature current;

a second adder circuit, operatively connected to said current detector circuit, said first adder circuit and said current limiter circuit, for generating a current error signal by subtracting the armature current from the sum of the speed error signal and the output of said current limiter circuit, said current limiter circuit suppressing the speed error signal when the current limit signal is generated;

a power circuit for generating an armature drive current;

a thyristor control circuit, operatively connected to said second adder, said power circuit and the armature, for controlling the flow of said armature drive current to the armature in dependence upon the output of said current limiter circuit so that the DC motor is driven at a rated output when the ON ACC/DEC signal is provided by said current limiter circuit and is driven at 1/n times the rated output when the current limit signal is generated by said current limiter circuit.

5. A DC motor control system, for providing a DC motor with a constant output characteristic, said DC motor having an armature, a field winding and a tachometer for providing a speed feedback voltage signal, said system comprising:

means for providing a digital speed command signal;

means for providing a direction signal;

a revolution command control circuit, operatively connected to said means for providing a direction signal, for outputting a direction of revolution command signal;

a digital to analog converter, operatively connected to said revolution command control circuit and said means for providing a digital speed command signal, for receiving the digital speed command signal and said direction of revolution command signal and for outputting an analog voltage signal;

an analog speed command generator circuit, operatively connected to said digital to analog converter, for receiving said analog voltage signal and for outputting an analog speed command voltage signal;

an ON ACC/DEC signal generator circuit, operatively connected to said revolution command control circuit and said analog speed command generator circuit, for receiving said analog speed command voltage signal and for providing an ON ACC/DEC signal when a change in said analog speed command voltage signal is detected;

a current limiter circuit, operatively connected to said ON ACC/DEC signal generator circuit and to the tachometer, for outputting said ON ACC/DEC signal when it is present and for outputting a current limit signal dependent upon the speed feedback voltage signal when said ON ACC/DEC signal is absent;

a first adder circuit, operatively connected to the tachometer and said analog speed command generator circuit, for generating a speed error signal by subtracting the speed feedback voltage signal from said analog voltage signal;

a first amplifier circuit, operatively connected to said first adder circuit, for amplifying said speed error signal;

a current detector circuit, operatively connected to the armature, for detecting the armature current;

a second adder circuit, operatively connected to said current detector circuit, said first amplifier circuit and said current limiter circuit, for outputting a current error signal by subtracting the armature current from the sum of the amplified speed error signal and the output of said current limiter circuit, said current limiter circuit suppressing the amplified speed error signal when the current limit signal is being generated;

a second amplifier circuit, operatively connected to said second adder circuit, for amplifying said current error signal;

a phase control circuit, operatively connected to said second amplifier circuit, for outputting a gate control signal in dependence upon said current error signal;

first and second gate circuits, operatively connected to said phase control circuit, for providing first and second gate signals in dependence upon said gate control signal;

a power circuit, operatively connected to said first and second thyristors, for providing a drive current; and first and second thyristors, operatively connected to said first and second gate circuits, respectively, said power circuit, and to the armature, for providing the drive current to the armature in accordance with the first and second gate signals.

6. A DC motor control system as set forth in claim 5, further comprising a resistor connected in parallel to the armature, and a field control circuit, operatively connected to the field winding and to said resistor, for controlling the current through the field winding to maintain the armature voltage constant.

7. A DC motor control system as set forth in claims 4 or 5, wherein said ON ACC/DEC signal generator circuit comprises:

a differentiation circuit, operatively connected to receive the analog speed command voltage signal, for providing a differentiation signal corresponding to a change in the analog speed command voltage signal;

a level comparator circuit, operatively connected to said differentiation circuit, for providing a start trigger pulse if said differentiation signal exceeds a predetermined limit; and a timer circuit, operatively connected to said level comparator circuit and said current limiter circuit, for providing said ON ACC/DEC signal when said start trigger pulse is received.

8. A DC motor control system as set forth in claim 7, wherein said level comparator circuit comprises a buffer amplifier, operatively connected to said differentiation circuit and a pair of comparators operatively connected between said buffer amplifier and said timer circuit.

* * * * *

UNITED STATES PATENT AND TRADEMARK OFFICE
CERTIFICATE OF CORRECTION

PATENT NO. : 4,300,079

DATED : November 10, 1981

INVENTOR(S) : SHIGEKI KAWADA ET AL.

It is certified that error appears in the above—identified patent and that said Letters Patent is hereby corrected as shown below:

```
Column 2, line 8, delete "is";
          line 29, "EMBODIMENTS" should be
                   --EMBODIMENT--.
Column 4, line 66, "signa" should be --signal--.
```

Signed and Sealed this

Twenty-second Day of June 1982

[SEAL]

Attest:

Attesting Officer

GERALD J. MOSSINGHOFF

Commissioner of Patents and Trademarks